(12) United States Patent
Li

(10) Patent No.: US 7,338,187 B2
(45) Date of Patent: Mar. 4, 2008

(54) MULTIPLE LAMP ILLUMINATION SYSTEM

(75) Inventor: Kenneth K. Li, Arcadia, CA (US)

(73) Assignee: Wavien, Inc., Valencia, CA (US)

(*) Notice: Subject to any disclaimer, the term of this patent is extended or adjusted under 35 U.S.C. 154(b) by 35 days.

(21) Appl. No.: 10/517,341

(22) PCT Filed: Jun. 18, 2003

(86) PCT No.: PCT/US03/18947

§ 371 (c)(1),
(2), (4) Date: Jul. 5, 2005

(87) PCT Pub. No.: WO04/001456

PCT Pub. Date: Dec. 31, 2003

(65) Prior Publication Data

US 2006/0044833 A1    Mar. 2, 2006

Related U.S. Application Data

(60) Provisional application No. 60/390,124, filed on Jun. 21, 2002.

(51) Int. Cl.
*F21V 7/06* (2006.01)

(52) U.S. Cl. ............... 362/297; 362/298; 362/247; 362/241; 385/857

(58) Field of Classification Search ............. 385/31, 385/36; 362/243–244, 245, 247, 241, 297, 362/339; 359/431, 627, 302, 304, 298, 857
See application file for complete search history.

(56) References Cited

U.S. PATENT DOCUMENTS

| 5,707,131 | A |   | 1/1998  | Li |
|-----------|---|---|---------|-----|
| 5,842,767 | A | * | 12/1998 | Rizkin et al. ............. 362/21 |
| 5,852,693 | A | * | 12/1998 | Jeong .................... 385/47 |
| 6,196,699 | B1 |  | 3/2001  | Stanton |
| 6,231,199 | B1 |  | 5/2001  | Li |
| 6,341,876 | B1 | * | 1/2002  | Moss et al. ............ 362/268 |

FOREIGN PATENT DOCUMENTS

JP          08031382 A  *  2/1996

* cited by examiner

*Primary Examiner*—Jong-Suk (James) Lee
*Assistant Examiner*—Robert May
(74) *Attorney, Agent, or Firm*—Fulbright & Jaworski LLP

(57) ABSTRACT

An illumination system including a plurality of lamps, a plurality of first light reflectors, a plurality of second light reflectors, and an output light guide. Each of the first light reflectors is arranged to reflect light output from one of the lamps onto an input of one of the second light reflectors, which in turn is arranged to direct light from an output of one the first light reflectors into an input of the output light guide, such that the outputs of each of the lamps is combined into a single output.

41 Claims, 7 Drawing Sheets

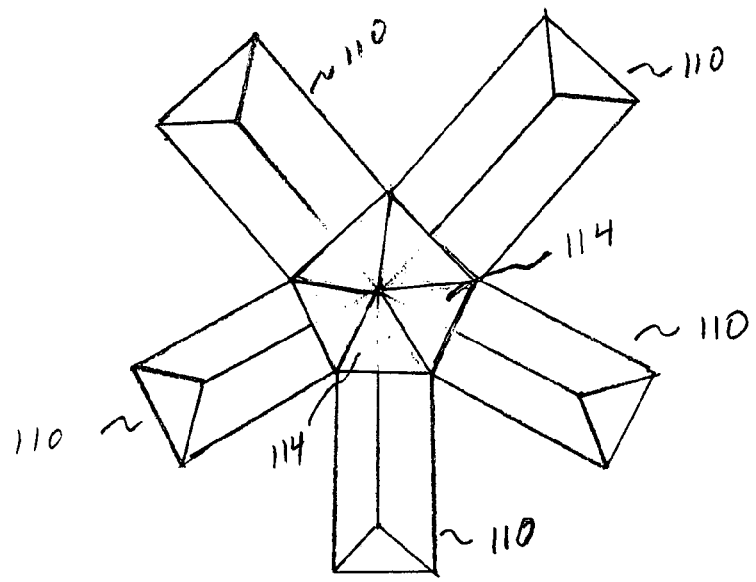
FIG. 7A
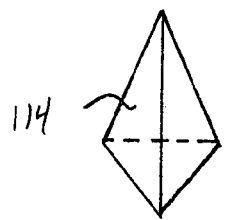
FIG. 7C
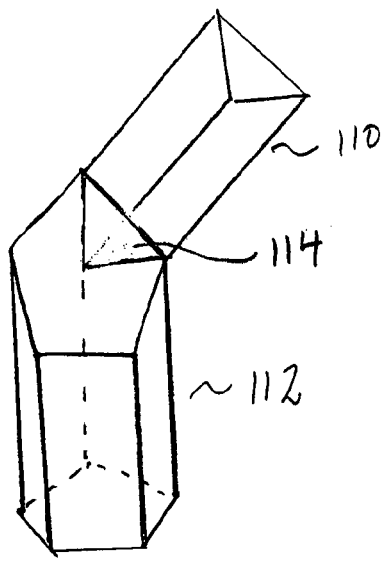
FIG. 7B
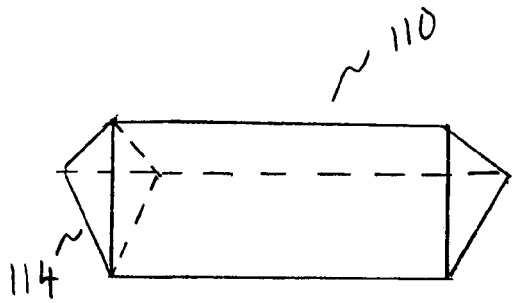
FIG. 7D
FIG. 7

MULTIPLE LAMP ILLUMINATION SYSTEM

CROSS-REFERENCE TO RELATED APPLICATIONS

This application is a National Phase of International Application Ser. No. PCT/US03/18947, filed Jun. 18, 2003, which claims benefit of U.S. Provisional Application Ser. No. 60/390,124, filed Jun. 21, 2002.

BACKGROUND OF THE INVENTION

1. Field of the Invention

The present invention relates lamp arrangements for projection displays.

2. Description of the Related Art

High power projection devices often employ high power xenon lamps in the multi-kilowatt ranges to a provide screen output of a few thousand lumens. Xenon lamps are inefficient and have long arc gaps at these high output powers. As a result, such units are expensive and bulky.

As an alternative, high power projectors have been designed which include several lower power lamps. For example, lower power metal halide or UHP types of lamps are more efficient, have smaller arc gaps, and cost less. The resulting projector can be more compact, lower in cost, and can produce equal or higher output when compared with xenon lamp systems. Nonetheless, combining the outputs of two or more lamps usually results in a loss of brightness from the lamps, and thus, reduces the efficiency of the system.

Thus, there is a need for new and improved lamp illumination systems for projection display, which have improved efficiency, size and affordability.

SUMMARY OF THE INVENTION

In accordance with an embodiment of the present invention, an illumination system includes a plurality of lamps, a plurality of first light reflectors, a plurality of second light reflectors, and an output light guide. Each of the first light reflectors is arranged to reflect light output from one of the lamps onto an input of one of the second light reflectors. Each of the second light reflectors is arrange to direct light from an output of one the first light reflectors into an input of the output light guide, such that the outputs of each of the lamps is combined into a single output.

Further applications and advantages of the present invention are discussed below with reference to the drawing figures.

BRIEF DESCRIPTION OF THE DRAWINGS

FIGS. 7A-7D are diagrams of an illumination system with five triangular light pipes, five four faced prisms and a five sided output pipe according to another embodiment of the present invention.

DETAILED DESCRIPTION OF THE PREFERRED EMBODIMENTS

According to the present invention, a light pipe system is provided for collecting and combining outputs from two or more lamps into a single output light pipe without loss of brightness. The present invention is well suited to be used with the dual paraboloid reflector system, although the invention is not intended to be limited to such applications. Traditional elliptical reflector systems or paraboloid reflector systems with a focusing lens can also be used. In these latter two case, brightness is partially lost in the elliptical and parabolic reflectors. However, the present invention still preserves the brightness of the light at the input of this system.

Figure 1:
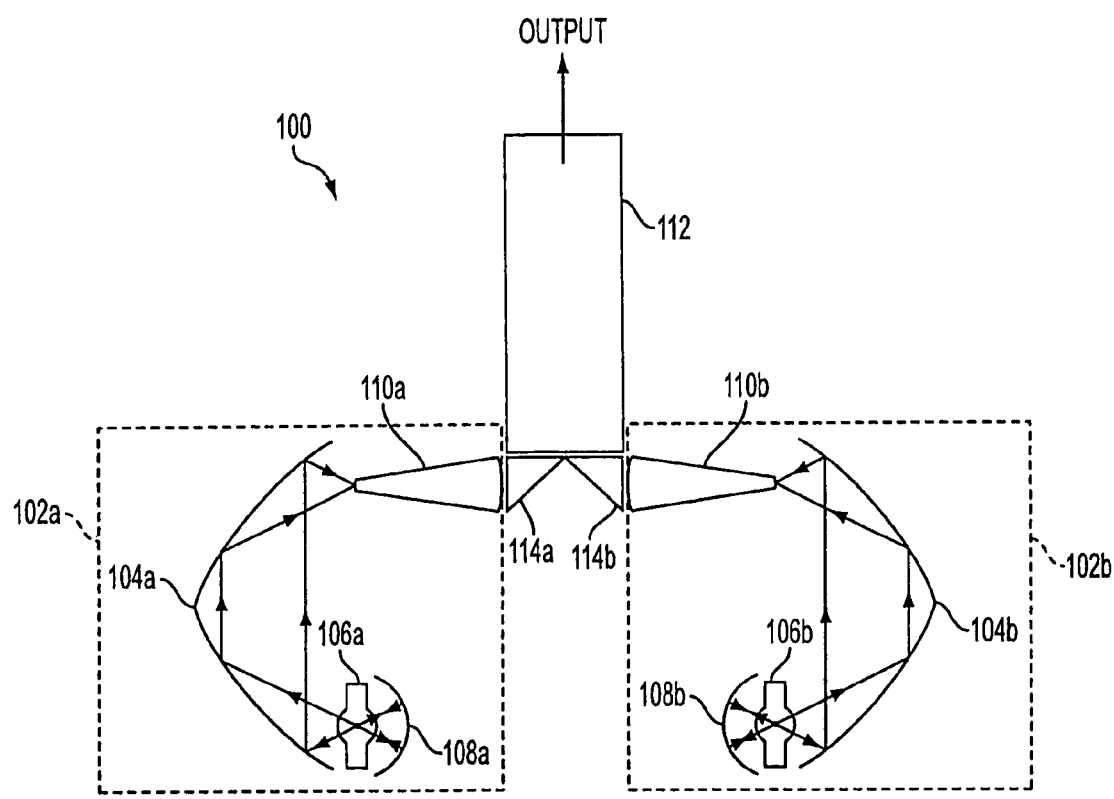
FIG. 1 is a diagram of a lamp illumination system according to an embodiment of the present invention.

FIG. 1 is a schematic diagram of a lamp illumination system using two dual paraboloid reflector systems in accordance with an embodiment of the present invention. The system 100 includes two sets of dual paraboloid reflector (DPR) systems 102a and 102b. Each DPR system 102 (a,b) includes a DPR 104 (a,b) a lamp 106 (a,b), a retro-reflector 108 (a,b) and a tapered light pipe 110 (a,b). The tapered light pipe may be designed with a convex output surface for further increasing efficiency. A flat output can also be used.

The light output from the arc of each of the lamps 106 (a,b) is reflected and focused by the retro-reflectors 108 (a,b) and DPR 104 (a, b) into a single light beam onto the input of each tapered light pipe 110 (a,b), and is transformed by the light pipe output surface to the desired area and angle. Due to mechanical constraints, the output of each of the light pipes 110 (a,b) may be reflected by 90 degrees, or other appropriate angles, by a reflector means such as a prism 114 (a,b), and coupled into the output light pipe 112. The two inputs to the output light pipe are mixed and produce a final, single output, which preserves the brightness of the arc and a uniform spatial profile for the projection display.

As shown, the output light pipe 112 can be straight, or it can be tapered depending on the output dimension and angle desired. Although the embodiment shows the used of a prism for reflection, other reflective means, like a mirror, can be used. Prisms, however, are preferred because they provide a continuation of the waveguide, which can be more efficient than other reflecting means. The slanting face of each prism 114 (a,b) can be bare in order to provide total internal reflection or can be coated for reflection, depending on the numerical aperture (NA) of the projection system. FIG. 1 shows a gap between the light pipes and the prisms. These gaps can be filled with a clear epoxy or with air, or no gaps may be provided at all.

Figure 2:
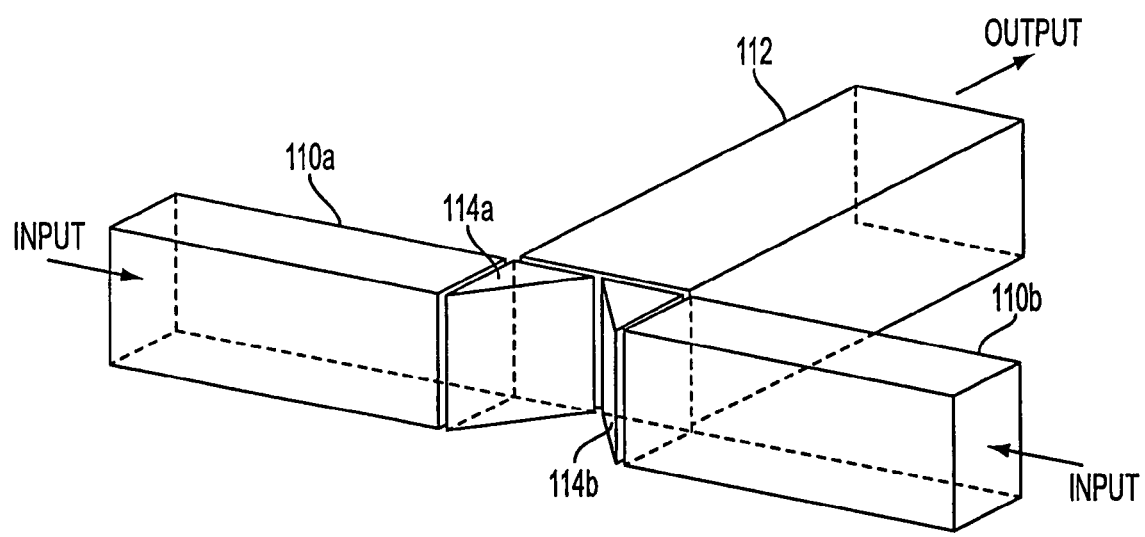
FIG. 2 is a perspective view of the lamp illumination system, according to an embodiment of the present invention.

FIG. 2 shows a perspective view of the light illumination system, according to an embodiment of the present invention. As shown, the input and output light pipes 110 (a,b) are straight. The light pipes can also be tapered as described above with reference to FIG. 1.

In general, the light input to the input light pipes 110 (a,b) can come from a number of sources, such as a DPR system such as shown in FIG. 1, or a tile traditional elliptical reflector or a parabolic reflector with a focusing lens, or both. Each of the lamps 106 can be the same type of lamp and wattage, or can be different types of lamp and/or different wattages, different categories, etc. For example, one lamp 106 can be a 200 W xenon lamp, while the other lamp 106 can be a 100 UHF lamp. In another case, the lamps can be chosen such that the emission spectrum thereof can be different in order to allow adjustment of the emission output with greater freedom.

FIG. 2 shows a gap between the light pipes and the prisms. These gaps can be filled with a clear epoxy or with air, or no gaps may be provided at all.

Figure 3:
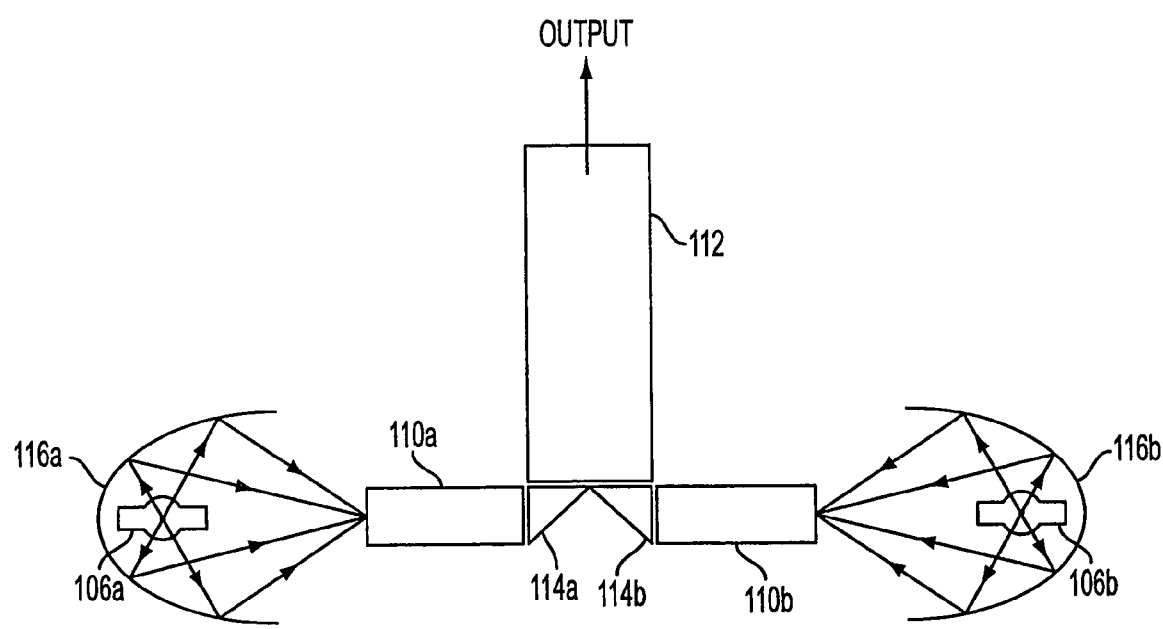
FIG. 3 is a diagram of a lamp illumination system that utilizes light pipes and two elliptical reflector systems according to another embodiment of the present invention.

FIG. 3 is a diagram of another embodiment of the present invention, which utilizes two light pipes and two elliptical reflector systems. This embodiment is similar to the one shown in FIG. 1, except that elliptical reflector systems are used instead of the DPR systems. Light output from lamps 106 (a,b) are each reflected to the input of light pipes 110 (a,b) via the elliptical reflectors 116 (a,b). The outputs from the lamps are combined to produce a single output via prisms 114 (a,b) and output light guide 112.

FIG. 3 shows a small gap between the light pipes and the prisms. These gaps can be filled with a clear epoxy or with air, or no gaps may be provided at all.

Figure 4:
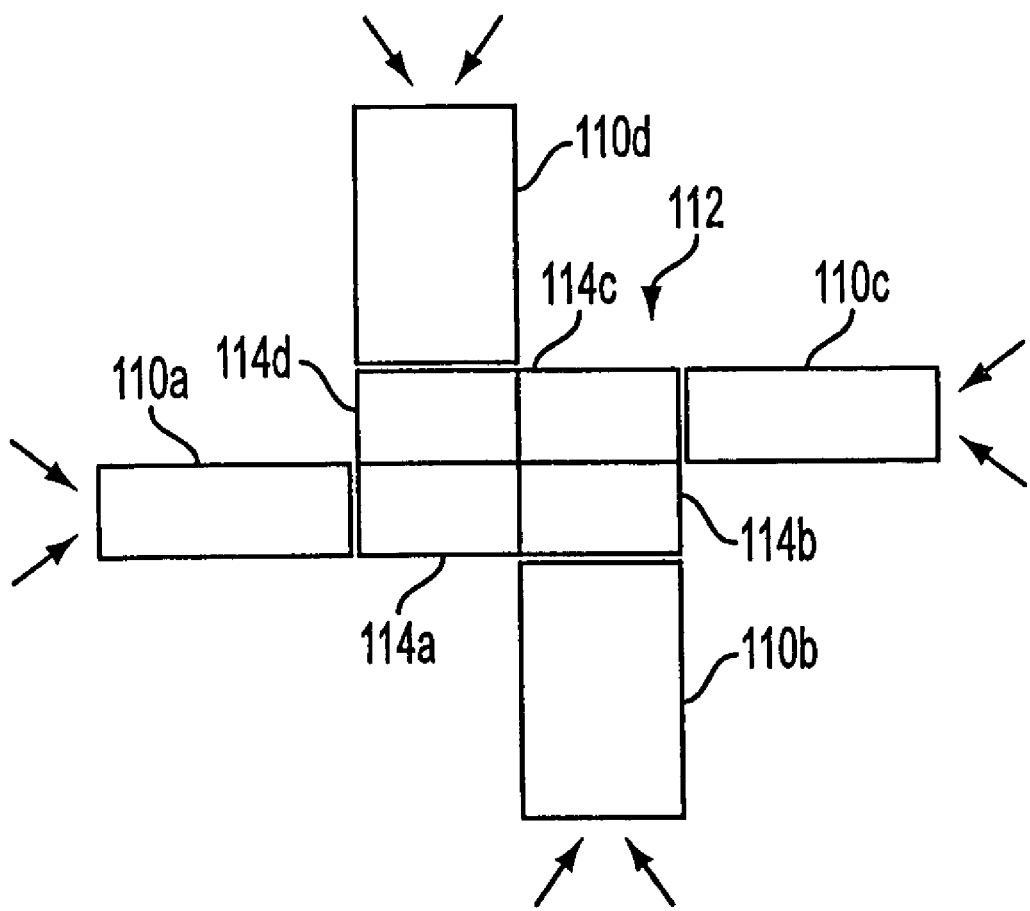
FIG. 4 is a view of an illumination system along the axis of the output light pipe according to another embodiment of the present invention.

The present invention is not intended to be limited to two-lamp configurations as shown above in FIGS. 1-3, and other multiple lamp configurations have been contemplated. For example, FIG. 4 shows a view of an illumination system along the axis of the output light pipe according to another embodiment of the present invention. In FIG. 4, four lamps are combined into a single output. In this case, four input light pipes 110 (a-d) and four prisms 114 (a-d) direct light from four lamps (not shown) into the output light pipe 112.

Like the embodiments described above, the light pipes 110 can be straight or tapered, and the light input can come from various types of reflectors, etc., to produce the desired output.

Figure 5:
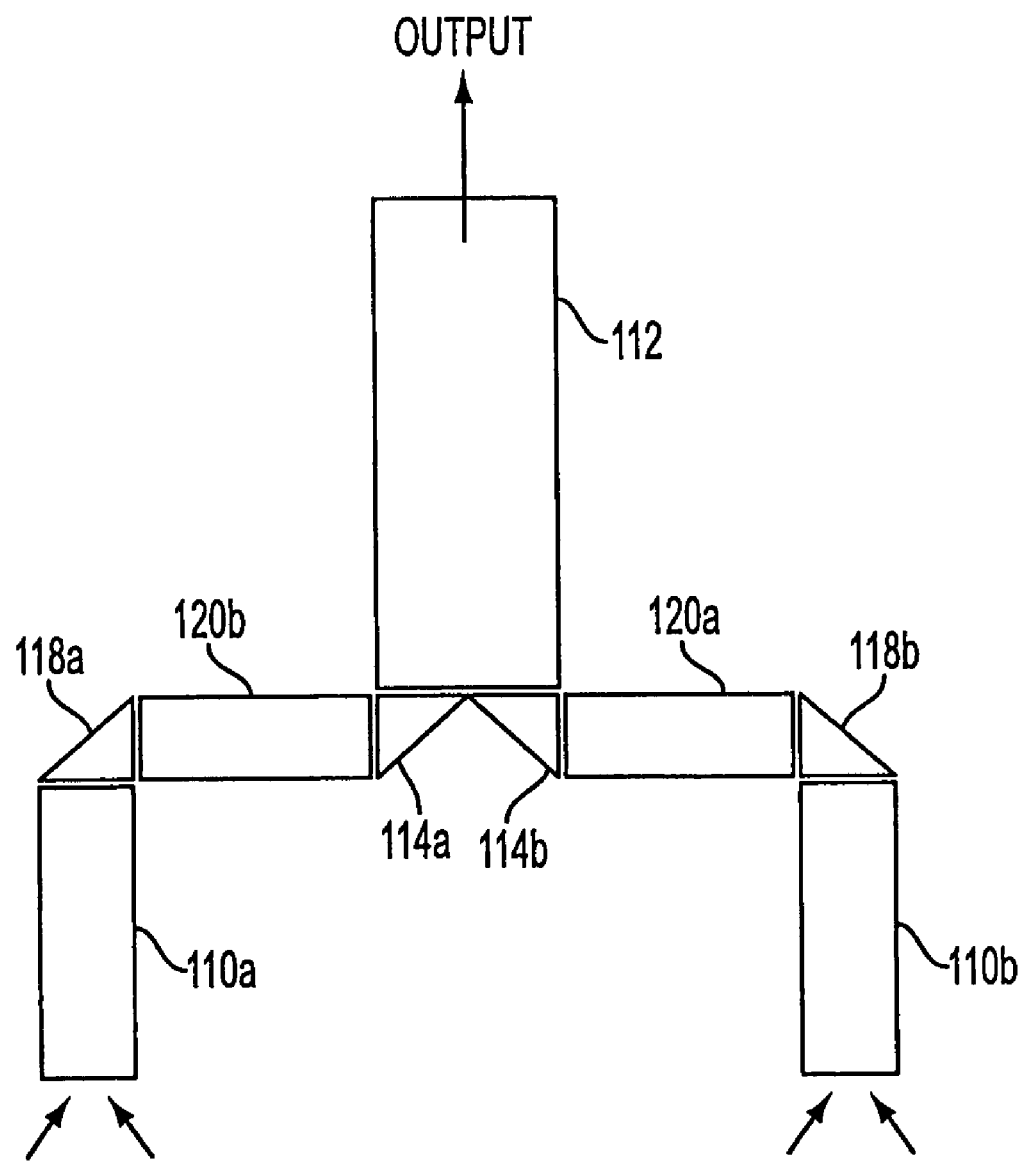
FIG. 5 is a diagram of an illumination system having extra connecting light pipes added to the input side of the system according to another embodiment of the present invention.

FIG. 5 shows a diagram of an illumination system in which extra connecting light pipes are added to the input side of the system according to another embodiment of the invention. Connecting light pipes 118 (a,b) act to change the direction of the input. Depending on the physical implementation, one or more of the inputs can be implemented with the connecting light pipe. These can be applied to the 2-lamp or 4-lamp systems described above, or other multi-lamp systems in accordance with the present invention.

The present invention can be applied to other polygonal input and output light pipes. For example, the input face of a triangular output light pipe can be divided into three input portions and a four-faced prism 114 (FIG. 7C) can be used to reflect light from a triangular input light pipe 110 (FIG. 7D) to the output light pipe 112. As shown in FIGS. 7A-B, a 5-sided output light pipe 112 can also be implemented by arranging five four-faced prisms 114 with five triangular input light pipes 110. Other polygonal output light pipes can be implemented in a similar fashion.

Although the above embodiments show that the input of the output light pipe 112 is divided equally to receive an equal amount of light from each of the lamps, unequal divisions can also be implemented. For example, when lamps with different arc sizes are used, the input area of the output light pipe can be divided unequally such that the overall output is optimized based on the unequal inputs.

Light pipes can be made from solid glass, quartz, etc., or can be hollow. Lamps used can be metal halide, UHP, mercury, high-pressure mercury, filament, sodium, light emitting diodes (LEDs), etc.

One should understand that in the embodiments described above, the light from the lamps 106 can be directly focused onto the prisms or other combination means without the use of input light guides (tapered light pipes) 110, such as directly from the retro-reflectors 108 (a,b) and DPR 104 (a, b) or via an additional lens or the like. For example, each DPR 102 can be configured to focus light output from lamps 106 directly onto prisms 114, or a lens (not shown) may be added to focus light onto the prisms. As an example, FIG. 6 shows light input directly into prisms 114a and 114b, each of which directs the input light into output light pipe 112.

Figure 6:
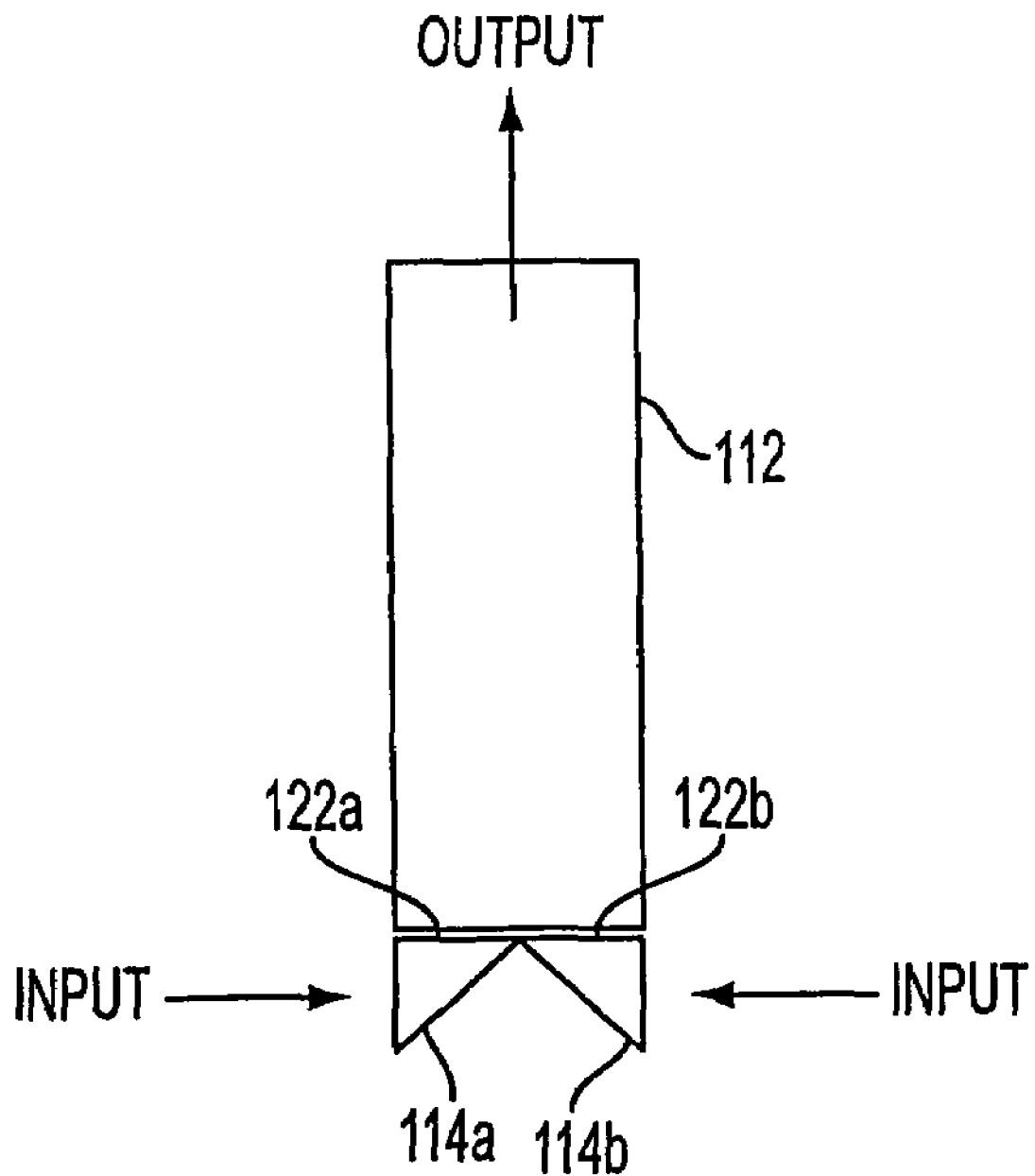
FIG. 6 is a diagram of a lamp illumination system without input light pipes according to another embodiment of the present invention.

As shown in FIG. 6, a gap is disposed between the light pipes and the prisms. These gaps can be filled with a clear epoxy or with air, or no gaps may be provided at all.

Thus, the present invention has been fully described with reference to the drawing figures. Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

I claim:

1. A lamp illumination system, comprising:
   a plurality of lamps;
   a plurality of first light reflectors, each first light reflector comprising a retro-reflector and a dual paraboloid reflector;
   a plurality of second light reflectors; and
   an output light guide; wherein
   each of said plurality of first light reflectors is arranged to reflect light output from one of said plurality of lamps onto an input of one of said plurality of second light reflectors, each of said plurality of second light reflectors is arranged to direct light from an output of one of said plurality of first light reflectors into an input of said output light guide, such that the outputs of each of said plurality of lamps is combined into a single output.

2. The system as recited in claim 1, further comprising a plurality of input light guides, and wherein each of said plurality of first light reflectors is arranged to reflect light output from one of said plurality of lamps onto an input of one of said plurality of input light guides, each of said plurality of second light reflectors is arranged to direct light from an output of one of said plurality of input light guides into an input of said output light guide, such that the outputs of each of said plurality of light guides is combined into a single output.

3. The system as recited in claim 2, wherein said plurality of input light guides comprise tapered light guides.

4. The system as recited in claim 2, wherein said plurality of input light guides comprise straight light guides.

5. The system as recited in claim 2, wherein said plurality of input light guides comprise triangular input light pipes, said plurality of second light reflectors comprise four-faced prisms, and said output light guide comprises a triangular output light pipe, wherein said four-sided prisms are arranged to reflect light from the input light pipes to the output light pipe.

6. The system as recited in claim 2, wherein said plurality of input light guides comprise five triangular input light pipes, said plurality of second light reflectors comprise five four-faced prisms, and said output light guide comprises a 5-sided output light pipe, wherein said four-sided prisms are arranged to reflect light from the input light pipes to the output light pipe.

7. The system as recited in claim 2, wherein said plurality of lamps consists of first and second lamps, said plurality of first light reflectors consists of first and second dual paraboloid reflectors (DPR), said plurality of input light guides consist of first and second input light guides, and said plurality of second light reflectors consist of first and second prisms; and
   said first and second DPR are arranged to respectively reflect light output from said first and second lamps onto inputs of said first and second input light guides, respectively, and said first and second prisms are arranged to direct light from said first and second input light guides to the input of said output light guide, respectively.

8. The system as recited in claim 7, wherein there are no gaps between said first and second input light guides and said first and second prisms, respectively.

9. The system as recited in claim 7, wherein gaps are disposed between said first and second prisms and said output light guide.

10. The system as recited in claim 9, wherein said gaps are filled with clear epoxy.

11. The system as recited in claim 7, further comprising first and second retro-reflectors arranged to reflect light from said first and second lamps onto said first and second DPRs, respectively.

12. The system as recited in claim 7, wherein there are no gaps between said first and second prisms and said output light guide.

13. The system as recited in claim 7, wherein said first and second prisms are identical 90 degree prisms and are arranged to input an equal amount of light into said output light guide.

14. The system as recited in claim 13, wherein an output side of said first and second prisms each divide the input of said output light guide, equally.

15. The system as recited in claim 7, wherein the input of said output light guide is divided among first and second output sides of said first and second prisms, proportionally based on an arc size of said first and second lamps, respectively.

16. The system as recited in claim 7, wherein said first and second lamps comprise a same type of lamp.

17. The system as recited in claim 7, wherein said first lamp comprises a different type of lamp than said second lamp.

18. The system as recited in claim 7, wherein gaps are disposed between said first and second input light guides and said first and second prisms, respectively.

19. The system as recited in claim 18, wherein said gaps are filled with clear epoxy.

20. A lamp illumination system, comprising:
a plurality of dual paraboloid reflector systems;
a plurality of reflectors; and
an output light guide; wherein each dual paraboloid reflector system comprises: a lamp; retro-reflector; and a dual paraboloid reflector; and
each of said plurality of dual paraboloid reflector systems is arranged to generate and focus light onto an input of one of said plurality of reflectors, each of said plurality of reflectors is arranged to direct light from an output of one of said plurality of dual paraboloid reflector systems into an input of said output light guide, such that the outputs of each of said dual paraboloid reflector systems is combined into a single output.

21. The system as recited in claim 20, wherein
said lamp is disposed between said retro-reflector and said dual paraboloid reflector in such a manner as to focus approximately all light output from the lamp into a single output; and
each said single output is focused onto the input of one of said plurality of reflectors.

22. The system as recited in claim 21, wherein a first DPR system and a second DPR system of said plurality of DPR systems are arranged such that an output side of said first and second DPR systems faces one another.

23. The system as recited in claim 20, further comprising a plurality of lenses disposed between said plurality of dual paraboloid reflector systems and said plurality of reflectors each arranged to focus light output from one of said plurality of dual paraboloid reflector systems onto an input of one of said plurality of reflectors.

24. The system as recited in claim 20, further comprising a plurality of input light guides, and wherein each of said plurality of dual paraboloid reflector systems is arranged to generate and focus light onto an input of one of said plurality of input light guides, each of said plurality of reflectors is arranged to direct light from an output of one of said plurality of input light guides into an input of said output light guide, such that the outputs of each of said plurality of light guides is combined into a single output.

25. The system as recited in claim 24, wherein
said lamp is disposed between said retro-reflector and said dual paraboloid reflector in such a manner as to focus approximately all light output from the lamp into a single output; and
each said single output is focused onto the input of one of said plurality of reflectors.

26. The system as recited in claim 25, wherein a first DPR system and a second DPR system of said plurality of DPR systems are arranged such that an output side of said first and second DPR systems faces one another.

27. The system as recited in claim 26, wherein a first input light guide of said plurality of input light guides is arranged to receive the light output from said first DPR system, and a second input light guide of said plurality of input light guides is arranged to receive the light output from said second DPR system, said first and second input light guides being parallel to each other and orthogonal to said output light guide.

28. The system as recited in claim 27, wherein a first prism of said plurality of reflectors is arranged to receive the light output from said first input light guide, and a second prism of said plurality of reflectors is arranged to receive the light output from said second input light guide, said first and second prisms being arranged adjacent to one another to cover the input area of said output light guide.

29. The system as recited in claim 28, wherein said first and second input light guides are tapered light guides, narrowing from an output side to the input side, said output side of each light guide being approximately a same area as an input side of said first and second prisms, and an output side of each prism having an area approximately equal to one half an area of the input of said output light guide.

30. The system as recited in claim 28, wherein gaps are disposed between said first and second input light guides and said first and second prisms, respectively.

31. The system as recited in claim 30, wherein said gaps are filled with clear epoxy.

32. The system as recited in claim 28, wherein gaps are disposed between said first and second prisms and said output light guide.

33. The system as recited in claim 32, wherein said gaps are filled with clear epoxy.

34. The system as recited in claim 28, wherein there are no gaps between said first and second input light guides and said first and second prisms, respectively.

35. The system as recited in claim 28, wherein there are no gaps between said first and second prisms and said output light guide.

36. A lamp illumination system, comprising:
a plurality of light means for producing light;
a plurality of collecting means for collecting and focusing the light from said each said light means, each collection means comprising a retro-reflector and a dual paraboloid reflector for collecting light from said each light means; and
combination means for combining the collected light from said collecting means and combine the collected light into a single output.

37. The system as recited in claim 36, wherein said said retro-reflector and said dual paraboloid reflector of said each collection means is operable to reflect light from said light means onto light guide means for guiding reflected light to said combination means.

38. The system as recited in claim 37, wherein said combination means comprise reflector means for reflecting light from said light guide means into a single output means for outputting the combined light from each of the light means.

39. The system as recited in claim 36, wherein said plurality of light means comprise a plurality of dual paraboloid reflector means for generating a single light output.

40. The system as recited in claim 36, wherein said collecting means comprises reflector means for reflecting light from said light means to said collecting means.

41. The system as recited in claim 40, wherein said collecting means further comprises focusing means for focusing light reflected from said reflector means to said collecting means.

* * * * *